3,230,070
CORROSION INHIBITION OF AQUEOUS SOLUTIONS CONTAINING AMMONIUM NITRATE
Herman Wissenberg, Munster, Ind., and Edwin S. Troscinski, Chicago, Ill., assignors to Standard Oil Company, Chicago, Ill., a corporation of Indiana
No Drawing. Filed Dec. 20, 1963, Ser. No. 332,294
3 Claims. (Cl. 71—29)

This invention relates to the corrosivity of aqueous nitrogenous solutions. More particularly it relates to aqueous solutions of nitrogenous material of the group consisting of ammonium nitrate, ammonium sulfate, ammonium phosphate and mixtures thereof, ammonium-ammonium nitrate mixtures and urea-ammonia-ammonium nitrate mixtures having reduced corrosion characteristics toward ferrous and aluminum metal surfaces, and to methods of producing such solutions.

The corrosive characteristics of aqueous solutions of the aforementioned nitrogenous materials are well known. All of these materials are highly corrosive to the ferrous metals and to a lesser degree toward the aluminum metals used in the equipment for the manufacture, storage, transportation and handling of such solutions. A major industry, namely the liquid fertilizer industry, has developed in recent years based upon these nitrogenous materials. Considerable tonnage of liquid fertilizers prepared from ammonia is manufactured each year. However, the corrosive nature of these liquid aqueous nitrogenous solutions has unduly increased the cost of such products due to the cost involved in replacing equipment lost from corrosion by such materials as well as precautionary measures required to minimize the hazards associated with the handling of such corrosive materials. While various corrosion inhibitors of one type or another have been suggested as remedial agents to overcome the corrosive characteristics of such ammonium salt solutions, such inhibitors have been found to be either partially effective or too costly to use. Consequently, a simple and effective means for minimizing the corrosivity of aqueous ammonium salt solutions is desired.

It has been discovered that cupric ammine is a highly effective and economical agent for inhibiting the corrosive characteristics of aqueous solutions of nitrogenous material of the group consisting of ammonium nitrate, ammonium sulfate, ammonium phosphate and mixtures thereof, ammonia-ammonium nitrate mixtures, urea-ammonia-ammonium nitrate mixtures, and especially for aqueous ammoniacal ammonium nitrate solutions. Cupric ammine is a well known copper ammonia complex having the formula $[Cu(NH_3)_n]^{++}$ wherein $n$ represents an integer of the group consisting of 2, 4, 5 and 6.

The amount of cupric ammine, as measured by the concentration in parts per million (p.p.m.) of the Cu (II) ion, employed as the corrosion inhibitor in the present invention can vary considerably. It has been found that an amount of cupric ammine sufficient to provide at least 5 p.p.m. of Cu (II) ion in the aqueous ammonium salt solutions reduces the corrosivity of such solutions. The maximum amount of cupric ammine is limited only by economic feasibility and generally not more than a concentration of about 600 p.p.m. Cu (II) ion is required. A concentration of about 50–100 p.p.m. Cu (II) ion is usually sufficient.

The reduction of the corrosivity of the herein defined aqueous ammonium salt solutions is effected by the incorporation and maintenance of an amount of cupric ammine sufficient to provide at least 5 p.p.m. of Cu (II) ion in such solutions. The incorporation of the effective amount of a cupric ammine can be obtained either by the in situ formation of the ammine or by the addition of appropriate amounts of preformed ammine. Cupric ammine is formed when an aqueous solution of a water-soluble cupric salt is added to aqueous ammonia containing excess ammonium hydroxide. The presence of cupric ammine in aqueous ammonium solutions is indicated by the intense blue color imparted to such solutions by the ammine. Cupric sulfate and cupric nitrate are exemplary of water soluble cupric salts suitable for producing the cupric ammine corrosion inhibiting agent of the present invention.

Aqueous solutions of the herein defined ammonium salts susceptible to corrosion inhibition in accordance with the present invention can vary from very dilute to very concentrated compositions of a single salt or mixtures thereof, with or without the presence of free ammonia or other nitrogenous materials.

The following examples are illustrative embodiments of the invention wherein percentages are by weight. In Examples I and II the Indiana Conductometric Test (Dynamic) was used to determine the corrosivity of the respective aqueous solutions. This test, which quantitatively measures corrosion rates, depends upon the measurement of the change in electrical resistance of a metal test strip immersed in the corrosive medium. The change in resistance is simply related to the decrease in the thickness of the test specimen caused by corrosion. In the test, specimen holders are designed to make electrical connections to two test strips suspended in large glass test tubes, the test strips, mild steel or aluminum, consist of specimens approximately three inches long, quarter inch wide, and exactly 0.001 inch thick. The test mixture is placed in the tube in contact with the test strips and stirred rapidly at 100° F. for 24 hours or until failure. From the observed change in electrical resistance of each test specimen during the course of the test, quantitative corrosion rates are calculated in terms of mils per years.

*Example I*

An ammonium nitrate based liquid fertilizer solution containing 5.9 percent ammonia, 50.8 percent ammonium nitrate, 12.4 percent urea and 30.9 percent water was prepared. The corrosion rate of the mild steel test specimen in this fertilizer solution was 3800 mils per year. The addition of 13 p.p.m. cupric sulfate (5 p.p.m. Cu (II)) to a portion of this solution reduced the corrosion rate to about 2000 mils per year. Additional portions of the fertilizer solution containing 38 p.p.m. cupric sulfate (15 p.p.m. Cu (II)) and 125 p.p.m. cupric sulfate (50 p.p.m. Cu (II)) showed a corrosion rate of 4 mils per year. When 250 p.p.m. (100 p.p.m. Cu (II)) and 1500 p.p.m. (600 p.p.m. Cu (II)) cupric sulfate were added to additional portions of the fertilizer solution, the corrosion rate was 2 mils per year.

*Example II*

An aqueous ammoniacal ammonium nitrate solution consisting of 10.3 percent ammonia, 71.5 percent ammonium nitrate, and 18.2 percent water was prepared. The corrosion rate of the mild steel test specimen for this solution was >8000 mils per year. The addition of 38 p.p.m. cupric sulfate reduced the corrosion rate to about 3000 mils per year. The addition of 125 p.p.m. cupric sulfate reduced the corrosion rate to 3 mils per year. A corrosion rate of 1 mil per year was found for solutions containing 250 p.p.m. and 1500 p.p.m. cupric sulfate. Aluminum coupons showed a corrosion rate in excess of 15 mils per year in the unhibited solution and a zero corrosion rate in solutions containing 50 or 100 p.p.m. of Cu (II). The corrosion rate of a mild steel test coupon in a portion of the aqueous ammonium nitrate solution of this example, containing about 148 p.p.m. copper nitrate (ca 50 p.p.m. Cu (II)) was 3 mils per year.

*Example III*

A carbon steel coupon in concentrated aqueous ammonium nitrate solution consisting of 83 percent ammonium nitrate and 17 percent water had a corrosion rate of 519 mils per year. The addition of 250 p.p.m. of cupric sulfate to the solution reduced the corrosion rate to 75 mils per year. The corrosion rate was determined by the weight loss of the steel coupons, 3.0″ x 0.5″ x 0.015″, after partial immersion of the coupons in unstirred test solutions at 160° F. for a period of two hours. The immersed surface area was about 3.1 sq. in. The immersed surfaces were scratched with a zinc rod to assure an active surface at the start of the test.

*Example IV*

A carbon steel coupon in an aqueous ammonium nitrate solution consisting of 60 percent ammonium nitrate and 40 percent water had a corrosion rate of 95 mils per year. The addition of 250 p.p.m. cupric sulfate to the solution reduced the corrosion rate to 13 mils per year. A coupon in a portion of the ammonium nitrate solution containing an amount of preformed cupric ammine sufficient to provide 100 p.p.m. Cu (II) had a corrosion rate of 6 mils per year. The corrosion rates in this example were determined by the weight losses of the coupons which were partially immersed in unstirred test solutions at room temperature for a period of two hours. The immersed surface area was about 2.1 sq. in. and activated by scratching with a zinc rod at the start of the test.

The above examples illustrate that aqueous ammonium salt solutions can be rendered substantially non-corrosive by the incorporation of cupric ammine in such solutions. An additional advantage of the use of cupric ammine as a corrosion inhibitor is that the blue color imparted to the solutions by the ammine produces visible evidence to the user that the solution has been properly inhibited. In addition to preventing excessive corrosion of mild steel, small quantities of the cupric ion present in aqueous ammonium nitrate based solutions that are to be used as plant food will provide trace quantities of copper essential to the development and growth of many plants.

Having thus described the invention, the invention claimed is:

1. The method of reducing the corrosion of aluminum metal in contact with an aqueous solution of a member of the group consisting of ammonium nitrate, ammonium sulfate, ammonium phosphate and mixtures thereof, ammonia-ammonium nitrate mixtures and urea-ammonia-ammonium nitrate mixtures which solution is normally corrosive to aluminum, which comprises incorporating and maintaining in said solution an amount of cupric ammine sufficient to reduce corrosivity of said solution, said amount sufficient to provide at least 5 p.p.m. of Cu (II) ion in said solution, and contacting said aluminum metal with said solution containing said ammine whereby the corrosion of said metal is reduced.

2. The method of reducing the corrosion of aluminum metal in contact with an aqueous ammoniacal ammonium nitrate solution normally corrosive to aluminum which comprises incorporating and maintaining in said solution an amount of cupric ammine sufficient to reduce corrosivity of said solution, said amount sufficient to provide at least 5 p.p.m. of Cu (II) ion in said solution, and contacting said aluminum metal with said solution containing said ammine whereby the corrosion of said metal is reduced.

3. The method of claim 2 wherein the concentration of Cu (II) ion is about 50–100 p.p.m. in said solution.

References Cited by the Examiner
UNITED STATES PATENTS

| | | | |
|---|---|---|---|
| 2,770,540 | 11/1956 | Vierling | 71—59 |
| 2,957,762 | 10/1960 | Young | 71—59 |
| 3,096,169 | 7/1963 | Shapiro et al. | 71—59 |

DONALL H. SYLVESTER, *Primary Examiner.*

ANTHONY SCIAMANNA, *Examiner.*